May 21, 1963

E. E. BERGLUND 3,090,175

TETRAHEDRON PRODUCING METHOD AND APPARATUS

Filed June 9, 1959

INVENTOR
Erik Eskil Berglund
By
Pierce, Scheffler & Parker
Attorneys

Fig. 3

May 21, 1963 E. E. BERGLUND 3,090,175
TETRAHEDRON PRODUCING METHOD AND APPARATUS
Filed June 9, 1959
8 Sheets-Sheet 3

INVENTOR
*Erik Eskil Berglund*
By *Pierce, Scheffler & Parker*
*Attorneys*

May 21, 1963     E. E. BERGLUND     3,090,175
TETRAHEDRON PRODUCING METHOD AND APPARATUS
Filed June 9, 1959     8 Sheets-Sheet 4

INVENTOR
Erik Eskil Berglund
By Pierce, Scheffler & Parker
Attorneys

May 21, 1963 — E. E. BERGLUND — 3,090,175
TETRAHEDRON PRODUCING METHOD AND APPARATUS
Filed June 9, 1959 — 8 Sheets—Sheet 5

INVENTOR
Erik Eskil Berglund
By Pierce, Scheffler & Parker
Attorneys

May 21, 1963   E. E. BERGLUND   3,090,175
TETRAHEDRON PRODUCING METHOD AND APPARATUS
Filed June 9, 1959                                              8 Sheets-Sheet 6

Fig. 13   Fig. 14

INVENTOR
Erik Eskil Berglund
By Pierce, Scheffler & Parker
Attorneys

May 21, 1963

E. E. BERGLUND 3,090,175

TETRAHEDRON PRODUCING METHOD AND APPARATUS

Filed June 9, 1959

INVENTOR
Erik Eskil Berglund

By Pierce, Scheffler & Parker
Attorneys

May 21, 1963 E. E. BERGLUND 3,090,175
TETRAHEDRON PRODUCING METHOD AND APPARATUS
Filed June 9, 1959
8 Sheets-Sheet 8

Fig. 19

INVENTOR
Erik Eskil Berglund
By Pierce, Scheffler & Parker
Attorneys

United States Patent Office 3,090,175
Patented May 21, 1963

3,090,175
TETRAHEDRON PRODUCING METHOD AND APPARATUS
Erik Eskil Berglund, Atvidaberg, Sweden, assignor to Hermorion Ltd., Toronto, Ontario, Canada, a company of Canada
Filed June 9, 1959, Ser. No. 819,072
Claims priority, application Sweden June 10, 1958
11 Claims. (Cl. 53—28)

A method is already known for the production of tetrahedron-shaped containers from a flat web material, which is first formed into a tube by winding or constricting in guide rings or some similar device, after which the lower part of the tube is continuously or intermittently filled with liquid or some similar substance, tetrahedron-shaped packages are obtained by closing the tube by means of transverse seals, each successive transverse seal being placed substantially at right angles to the preceding seal, and finally the tetrahedron-shaped packages thus obtained are separated from the tube by severing at the transverse seals.

It has been shown that the above described method has led to the formation of crease lines or cracks in the walls of the container, both in the region of the transverse seals and in the material lying between the joints. Such creases or cracks give the container a less attractive appearance, especially in the case of containers for liquids, and still worse, they lower the stability of the liquid container and form points at which inner or outer dampness can attack and damage the container walls, so that ugly patches and even leakage can occur.

It is naturally desirable in the first place to prevent the occurrence of such crease lines and cracks, and the use of permanently settable or deformable material, e.g. a plastic gives perfect results.

For economic reasons, however, this is not normally feasible. Attempts are being made to discover cheap one-way or disposable packages, and for this reason the material used is often paper, covered on the inside with a thin film of polyethylene or some such plastic. In order to protect the paper from outside dampness the external surfaces can be impregnated with a cheap water repellent such as paraffin.

It has become clear, however, that it is difficult to keep the container water-tight with the use of this material. The quality of the paper used is of vital importance, and the above-mentioned formation of creases or cracks during the actual production process sometimes results in a weakening of the paper and rupturing of the very thin polyethylene film. If this happens, the liquid in the package will penetrate the paper and soften it, so that it breaks during handling or even from the mere pressure of the liquid inside. This necessitates a strict check on the quality of the raw material, which in turn involves increased costs.

The cheaper (and stiffer) the material used, the greater will be its tendency to crack, and with most packaging materials such faults will inevitably occur. In view of this it is of importance to discover a method which will localise these faults to the sealing zone at the transverse seals, where they will have the least possible effect on the quality of the finished container.

This must be done not only for the cracks which occur during the actual forming of the tetrahedron, but also for those which arise when the tube is being wound or constricted from a flat web, guided during the filling operation to the sealing jaws etc. The cause of these latter cracks lies in the mechanical handling of the tube-shaped starting material or the flat web material which forms the tube.

These operations can however, very easily lead to damaging, which in turn causes folds, cracks, or even holes in the material. In order to eliminate the damage caused by such mechanical handling of the flat web or tube-shaped material, according to the present invention all such handling within those zones of the flat web or tube-shaped material which are liable to cracking or creasing should be carried out so that the creases caused by the final forming of the tetrahedron-shaped container fall within its sealing zones.

Thus the present invention relates to a process and an apparatus for the production of tetrahedron-shaped containers from tube-shaped packaging material in which the actual shaping is so arranged that the risk of cracks and breakages in the walls of the container is reduced to an absolute minimum.

In this respect the invention has the great advantage of allowing the use of material which has a lower quality from the point of view of elasticity, for example cheap paper treated in the way described above, metal foil, thin tin-plate or other such material. In this way it will be possible not only to produce existing types of packages at a reduced cost, but also to package oils etc. in thin tin-plate containers of the tetrahedron type, which has hitherto not been possible.

Both the process described by the invention and the apparatus for carrying out this process are based on the observation that a tube-shaped packaging material of insignificant elasticity, which by flatpressing in alternately one and the other of two perpendicular directions, is converted into a continuous strand of tetrahedrons, must of necessity sustain cracking or creasing. The principal object of the present invention is to place these more or less (depending on the elasticity of the material) unavoidable creases so that they do not weaken the container.

According to the invention this object is achieved by carrying out each flat-pressing of the tube in principle in at least two operations. A first clamping or pre-shaping of the tube is made with e.g. the help of jaws resembling narrow blades transverse to the longitudinal direction of the tube, which make a sharp crease across the tube along the blades or edges of the jaws. The next operation is a second clamping (final shaping) between the jaws, whereby the line crease is enlarged or broadened in the direction of the tube axis to a flat compressed surface, so that the crease (or creases) is placed within the flat surface where the seal is made, either before or at the same time as two adjacent containers are separated.

Where the shape of the sealing apparatus for the joints between the tetrahedron-shaped containers—whether this operation is carried out by means of e.g. heat sealing or cutting and folding over—makes it difficult to accommodate at the same time both the narrow blade-like jaws, which are to produce a sharp crease transversely of the tube, and the sealing jaws together with the cutting and folding device, all such necessary operations on the paper web or the subsequently shaped tube connected with the guiding, stretching or preshaping of the tube and paper web, and involving a risk of breakage, folding, cutting or other such damage to the web or tube are carried out in those zones of the paper web or the tube which at the moment of sealing are placed in the sealing surfaces so that such deformations are enclosed in the sealing surfaces and do not affect the actual tetrahedron surfaces.

With a particularly suitable embodiment of the process according to this invention, there occurs a pre-shaping or creasing of the tube or paper web along a line that is mainly at right angles to the longitudinal axis of the tube at a distance from the centre line of the preceding cross-joint which, along the generatrix of the tube, corresponds to the length of two tetrahedron generatrices plus two seal widths or any multiple of this distance.

Both the process according to the present invention and the apparatus for carrying out will be hereinafter described in greater detail with reference to the accompanying drawings in which.

Previous methods for producing tetrahedron-shaped containers have made use of a pair of more or less flat jaws which clamped the tube, whereby the liquid possibly present within the container is simultaneously squeezed away. If the material forming the tube does not have sufficient elasticity, two weakness lines running across the tube in the form of cracks or breakages (at 1 in FIG. 1) will of necessity arise.

Figure 1:
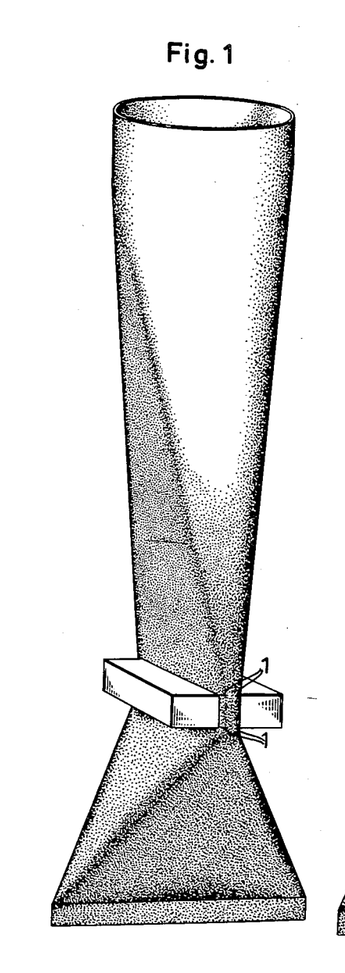
FIGURE 1 shows a stage in the tetrahedron forming according to the process that has been used up to the present.

These cracks as a rule run in a zig-zag line and extend both within the tetrahedron already produced and into the tube, the base of which has been compressed or in other words into the next tetrahedron-to-be.

Figure 2:
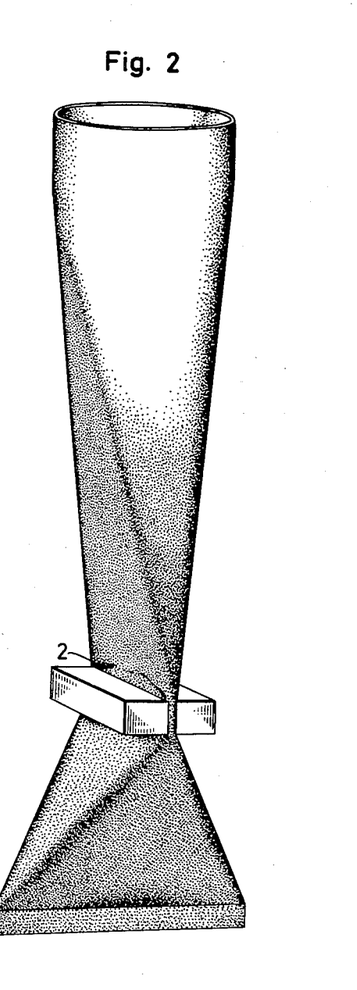
FIG. 2 shows how the formation of creases spreads or is distributed if the clamping jaws slide along the generatrix of the tube.
Figure 3:
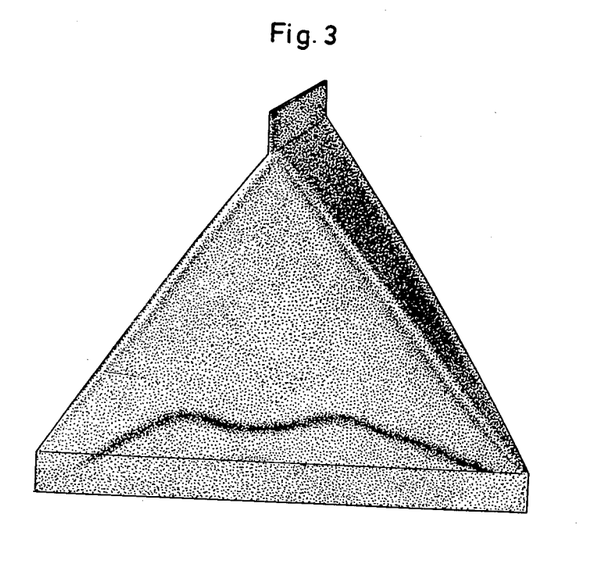
FIG. 3 shows a container with cracks which have arisen during this process.

If, in addition, the jaws slide along the generatrix of the tube, as has been usual in previous apparatus for the production of tetrahedrons, a crease is formed similar to that shown at 2 in FIG. 2. In this case the cracks formed in the finished container appear as in FIG. 3.

Figure 4:
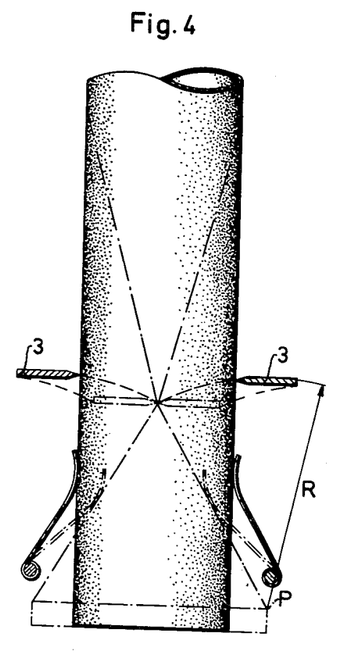
FIG. 4 is a schematic drawing of an apparatus according to the invention for compressing a tube along a narrow surface or line.

According to one embodiment of the present invention the pre-shaping of the tetrahedron takes place with the help of narrow edge-like jaws transverse to the longitudinal direction of the tube in the manner shown in FIG. 4. A more or less rounded edge 3 moves in towards the tube and meets a corresponding edge 3 moving in from the other direction. In order to prevent them from sliding along the tube these shaping blades should move in a roughly circular path having a radius R whose centre P lies at the upper corner of the seal last produced.

In this way the inevitable cracks are formed in the crease immediately under the edge and mainly along the line of the said edge.

Figure 15:
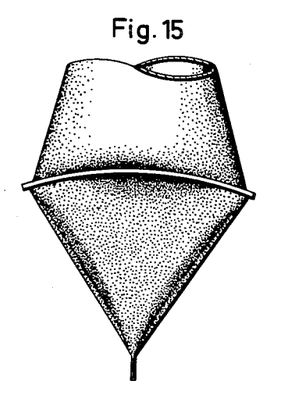
FIG. 15 is a schematic drawing of one embodiment of a blade-like jaw that is especially suitable for certain types of material.

Because the tension conditions around the crease as for example in the case shown in FIG. 4 are asymmetrical, it is advisable when using certain materials to curve the edges as shown in FIG. 15.

When the liquid pressure is high and the consequent internal tensions considerable, it can in certain cases be more suitable to curve the edges in the opposite direction.

Figure 5:
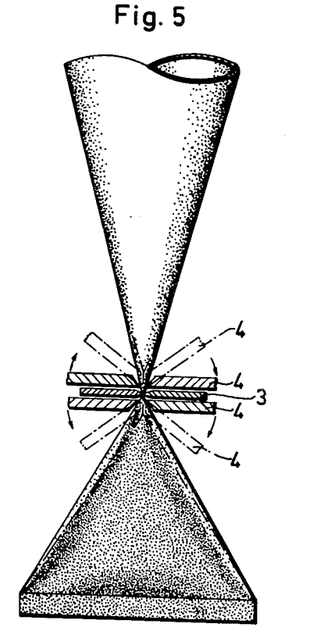
FIG. 5 shows how the crease thus produced is enlarged into a sealing area.

This pre-shaping of the tube is followed by a final shaping (sealing), which can be carried out as shown in FIG. 5, where a pair of divided jaws 4 slide along the shaping edges 3 and thereafter rotate from the position shown by the continuous line to the position shown by the broken line. These jaws are suitably provided with heating elements which perform the sealing process.

Figure 8:
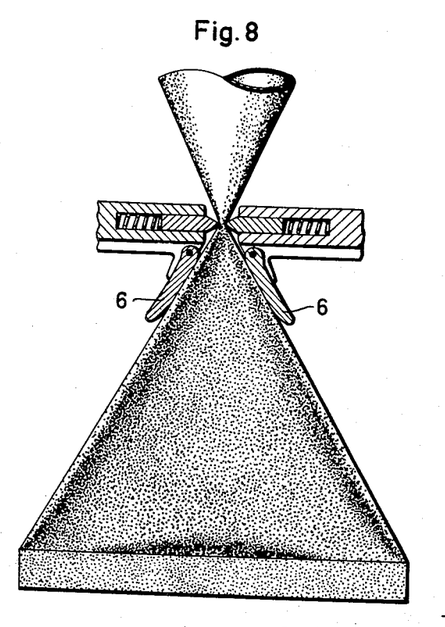
FIGS. 8, 9 and 10 show various embodiments of the apparatus for pre-shaping, and FIGS. 11 and 12 for the final shaping and sealing.

The jaws can of course also be flat and apply pressure directly above the crease (without any rotation) if the material forming the tube is not too inelastic, as in for example FIG. 8. With this method, however, small defects or cracks (breaks) easily occur right in the corner.

With the embodiments above-described it is particularly suitable to allow the shaping edges also to carry out the severance of the completed tetrahedron as soon as the sealing is completed.

By this method of clamping, a folding (or in fact a creasing) of the tube takes place, so that a rectilinear dividing is obtained and this can be enlarged into a surface without producing any notable tension in the side surfaces. During sealing the crease line is placed in the centre of the sealing zone, i.e. near the cut edge during severance.

Figure 6:
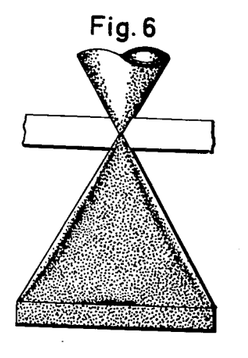
FIGS. 6 and 7 show a somewhat different embodiment according to the same principle as FIGS. 4 and 5.
Figure 7:
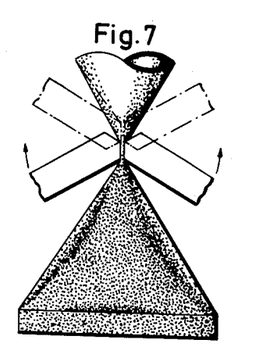

FIGS. 6 and 7 show two stages of another embodiment of the present invention. Here the jaws are pointed and heat sealing occurs by means of pivoting the jaws about their points first in one direction, as in FIG. 7, and then in the other direction, as shown by the dotted line in FIG. 7.

Figures 11, 12:
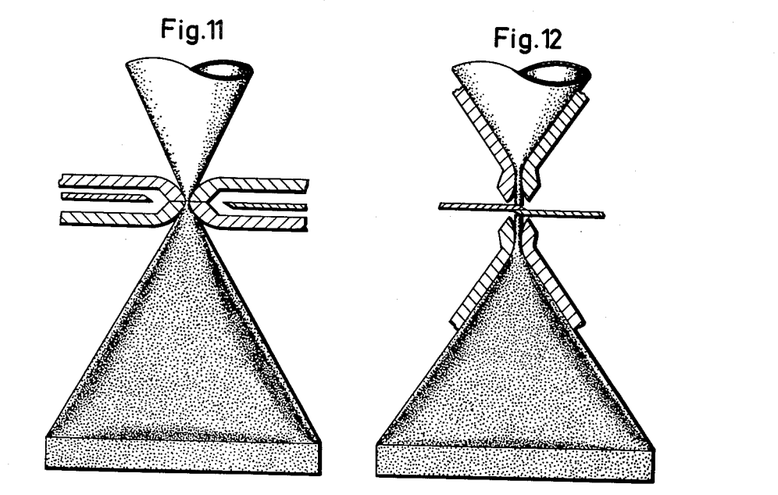

FIGS. 11 and 12 show a modification of the jaws according to FIG. 5 in which the jaws roll against the tube when pivoting.

Figure 9:
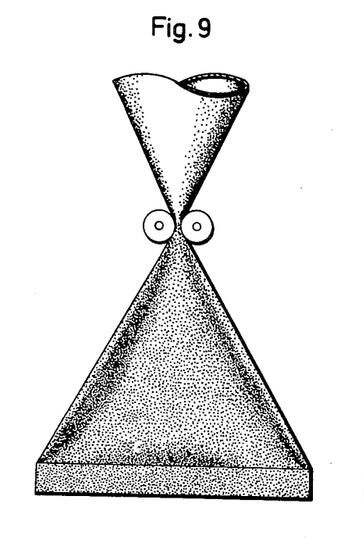
Figure 10:
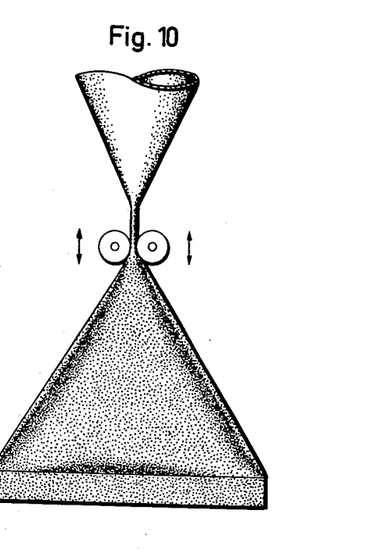

FIGS. 9 and 10 show in the same way a joining process in which the tube is deformed with the help of a pair of rollers which thereafter, starting from their central position, roll out a sealing zone in one or both directions.

The methods described above for embodying the invention result in the volume of the tetrahedron formed by flattening the tube of material and then sealing the upper edge being reduced during the final forming and sealing.

Figure 13:
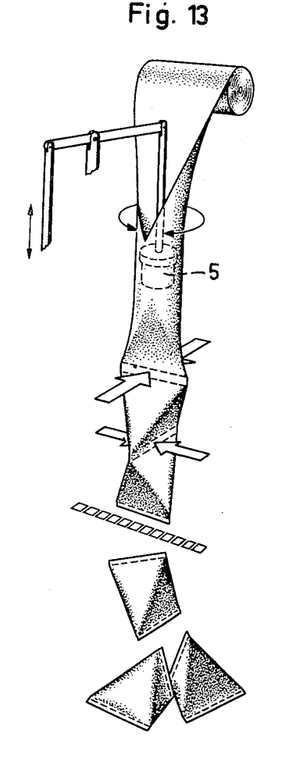
FIG. 13 is a schematic drawing of an apparatus for the further reduction of tensions in the packaging material, which apparatus is in certain cases most suitable for use in combination with the apparatus according to the invention.

In order to prevent too large an internal pressure from arising one can use either a pair of supporting members in the form of springs or some similar device (shown as leaf springs in FIG. 4 and by 6 in FIG. 8) which press the tetrahedron side panels somewhat inwardly but which spring out during the actual sealing, or an arrangement similar to that shown in FIG. 13.

This arrangement consists of a piston 5 set in the upper part of the tube, which piston moves in timed relationship with the jaws in such a way that the pressure of the liquid at the bottom is always at a minimum. The piston is suitably fitted with a valve so that its descending motion, in conjunction with the downward feeding of the container material occurs with the least possible resistance. This piston 5 may also run on guides which can at the same time act as an interior support or mandrel for the tube on its way down to the closing devices.

The upward stroke of the piston causes a stabilisation of the pressure inside the tube, and this process can be so adjusted that the container which is about to be sealed will contain just so much liquid that it will not burst during the subsequent sealing.

The relatively flat surfaces acquired by the tetrahedron-shaped container during the latter stages of its production function in fact as membranes and permit a certain latitude.

Figure 14:
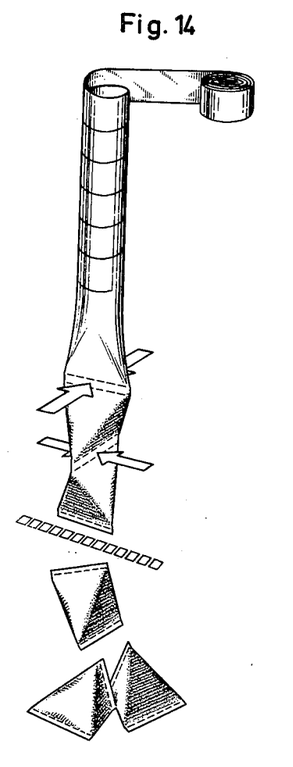
FIG. 14 is a schematic drawing of an application of the invention when the containers to be produced are made from e.g. aluminium foil or tin-plate.

With the apparatus according to this invention it is possible to use highly inelastic material, e.g. sheet metal. With this material it is as a rule not possible in practice to use the method shown in FIG. 13 for producing the original tube. Instead, this should be helically wound as shown in FIG. 14.

When using sheet metal or similar material it has proved difficult to seal the flat areas in the same way as with thermoplastic material. The stiffness inherent in the material has been used in this case so that the formation of the flat sealing zone is followed by severance, whereafter the cut edge is folded over possibly with a sealing strip using a method known per se.

Figure 16:
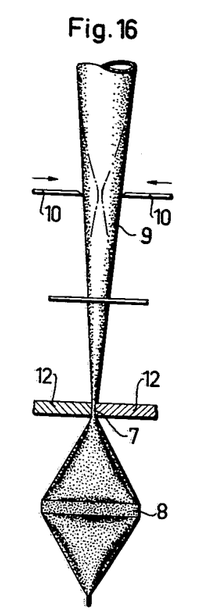
FIG. 16 shows the principle of a modification of the pre-shaping according to the present invention, and FIG. 17 the same apparatus seen from the side.
Figure 17:
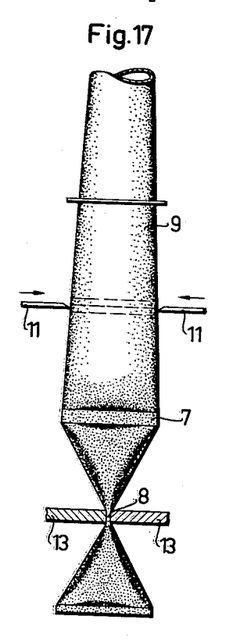
Figure 19:
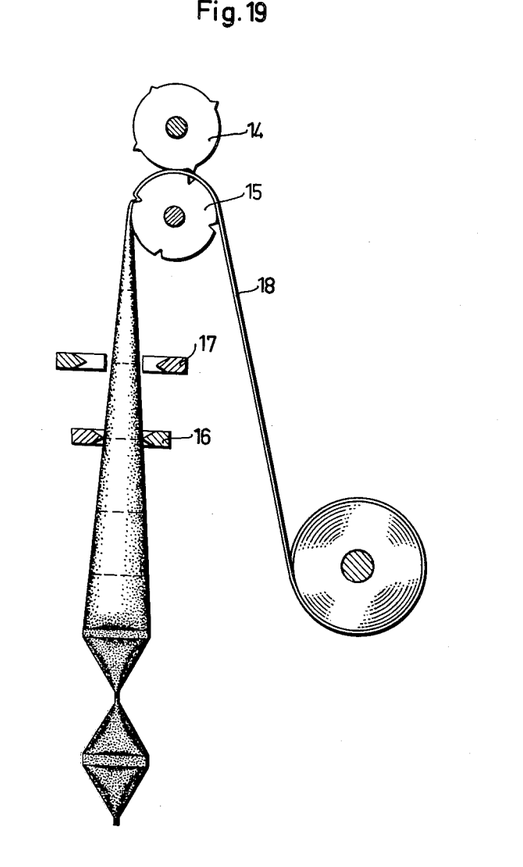
FIG. 19 shows an apparatus for producing a crease line in the flat section of the web material.

The apparatus shown in FIGS. 16–17 are suitable for those cases when space is required for the folding mechanism, and FIG. 19 shows an apparatus for use if a simple construction is required for the sealing jaws.

When a transverse joint (7 and 8) is made, the upper part of the tube tends to adjust itself as shown in FIGS. 16 and 17. The degree of flattening in the plane of the most recent transverse joint is dependent upon the qualities of the material forming the tube; if a relatively stiff material such as paper or sheet metal is used the flattening will extend a considerable way up.

According to one embodiment of the invention this flattening is used in the pre-shaping of the tube with a pair of sharp edge-like jaws 10 and 11, whereby the creasing jaws 10 work in conjunction with the sealing jaws 12 and the creasing jaws 11 with the sealing jaws 13. The distance between each pair of creasing jaws and the centre line of the sealing jaws with which they cooperate shall be two tetrahedron generatrices plus two sealing zones or a multiple of this distance.

The work of the creasing jaws is considerably facilitated since the tube assumes an oval cross-section as a result of the sealing jaws clamping, and the crack line (which shows a tendency to run in a zig-zag beneath the edge of the jaws) does not develop as far along the longitudinal axis of the tube as it does if it is placed in front of the sealing jaws.

Figure 18:
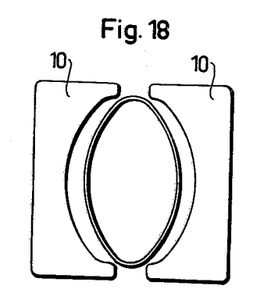
FIG. 18 shows one embodiment of a pair of pre-shaping jaws seen from above. Finally

In order to minimise the changes in volume during the pre-shaping of the tube it is in certain cases suitable for the jaws 10 and 11 to be shaped as shown e.g. in FIG. 18. The crease formed will hereby be most sharply pronounced near the edge of the coming joint. This is important if the subsequent sealing zone is to cover the crack line completely without having to be made too wide.

When jaws 10 and 11 relax their grip after making the crease, the tube, provided its material is not too stiff, will return to its former oval shape as a result of the pressure of the liquid inside, but when the sealing jaws come into action the crease which then results follows the earlier crease line and is easily contained within the sealing zone.

Naturally the shape of the creasing jaws will depend upon the material used for the tube (FIG. 18 shows a suitable shape if the material is relatively stiff). It is nevertheless important that the tube should be creased in advance, so that the subsequent sealing encloses the crease which, unless the material of the tube is extremely elastic, inevitably arises during the shaping of a tube into a chain of tetrahedrons.

FIG. 19 shows another method embodied in the invention. A pair of guide rollers 14 and 15 are arranged so that as early as in the paper web 18 they produce crease lines at right angles to the longitudinal direction of the web at a distance that corresponds to the distance between two consecutive transverse seals, and the action of these rollers is synchronised with the sealing jaws so that during the sealing process the crease lines are placed as centrally as possible in the sealing zone and are enclosed in it.

FIG. 19 also shows a shaping or guide ring 16, which is arranged to grip the tube just at or in the vicinity of a crease line; the movements of the ring and the feed are synchronised so that the sides of the tetrahedrons being formed are not affected.

The guide 16 (which is suitably divided) then releases its grip and is succeeded by another guide ring 17 which grips the tube at a future sealing zone.

In this way damage to the surfaces of the tetrahedrons is avoided and such creases as are unavoidable are concentrated within the sealing zones where their ill-effects are entirely eliminated.

The operation of the crease and sealing jaws may be effected e.g. in the manner shown in British Patent 711,855, and the guiding of the various movements may be effected e.g. with the help of cam curves in the way shown in British Patent 716,783.

By using this method it is above all possible to use cheaper raw materials than has hitherto been the case.

I claim:

1. A method of producing tetrahedron-shaped packages from a relatively stiff web material, e.g. one side plastic coated paper, comprising the steps of transversely creasing the web material along longitudinally spaced lines; forming the web material into a longitudinally seamed tube; dividing the tube into sealed tetrahedron-shaped packages through transversely sealing the tube in alternatingly one and the other of directions perpendicular to each other and along relatively narrow transverse zones each having an individual one of said transverse crease lines located within said zone; and separating the packages thus formed from each other through severing along transverse lines in said seals.

2. A method of producing tetrahedron-shaped packages from a tube of relatively stiff packaging material such as an internally plastic coated paper tube, comprising the steps of transversely creasing the tube along longitudinally spaced lines and with consecutive crease lines disposed perpendicular to each other, enlarging each of said crease lines in opposite directions therefrom longitudinally of the tube axis into a flat sealable zone transverse to the tube axis and with said crease line located within said zone, sealing each said zone to form tetrahedron-shaped packages interconnected at said sealed zones, and then separating said packages from each other by severing along transverse lines in said sealed zones.

3. Apparatus for producing tetrahedron-shaped packages from a tube of relatively stiff packaging material such as an internally plastic coated paper tube, comprising means for initially establishing longitudinally spaced crease lines in said tube transversely of the longitudinal axis thereof, successive crease lines being perpendicular to each other, and means thereafter enlarging said crease lines in a direction longitudinally of said tube to establish successive flat transverse sealing zones perpendicular to each other which include said crease lines.

4. Apparatus for producing tetrahedron-shaped packages from a tube of relatively stiff packaging material such as an internally plastic coated paper tube, comprising a pair of rolls arranged at opposite sides of the tube with their axes parallel and transverse to the longitudinal axis of the tube, means effecting movement of said rolls toward each other with the tube therebetween so as to establish a crease line in the tube extending transversely, and means thereafter effecting movement of said rolls longitudinally of the tube axis from said crease line first in one direction and then the other so as to enlarge said crease line into a transverse sealing zone, successive crease lines and sealing zones enlarged therefrom being perpendicular to each other.

5. Apparatus for producing tetrahedron-shaped packages from a tube of relatively stiff packaging material such as an internally plastic coated paper tube, comprising a first set of jaws with parallel relatively narrow edges arranged at opposite sides of the tube transverse to the longitudinal axis of the tube and movable towards each other to establish a crease line in the tube extending transversely, and a second set of jaws likewise arranged at opposite sides of the tube transverse to the longitudinal axis of the tube and embracing said first set of jaws, said second set of jaws being movable to enlarge said crease line into a sealing zone and which includes said crease line and successive crease lines and sealing zones enlarged therefrom being perpendicular to each other.

6. Apparatus as defined in claim 5 wherein said second set of jaws enlarge said crease line into a sealing zone by executing a pivotal movement about said crease line.

7. Apparatus as defined in claim 5 wherein the end faces of the jaws of said second set are flat and said crease line is enlarged into a sealing zone by moving the jaws of said second set towards each other in a direction transverse to the longitudinal axis of the tube.

8. Apparatus as defined in claim 5 wherein a jaw of said first set of jaws is slidably mounted within a jaw of said second set of jaws and the edge of said jaw of said first set protrudes beyond the end face of said jaw of said second set.

9. Apparatus for producing tetrahedron-shaped packages from a tube of relatively stiff packaging material such as an internally plastic coated paper tube, comprising a pair of jaws arranged at opposite sides of the tube and movable towards each other in a direction transverse to the longitudinal axis of the tube, the end faces of said jaws being tapered and terminating in an edge extending transverse to the tube axis, said edges of said jaws serving to establish a transversely extending crease line in the tube, and said jaws being also movable pivotally about said crease line first in one direction and then the other such that said tapered end faces enlarge said crease line into a sealing zone and which includes said crease line located within the same, successive crease lines and sealing zones enlarged therefrom being perpendicular to each other.

10. Apparatus for producing tetrahedron-shaped packages from a tube of relatively stiff packaging material such as an internally plastic coated paper tube, comprising a pair of jaws arranged at opposite sides of the tube and movable towards each other in a direction transverse to the longitudinal axis of the tube, the end faces of said jaws being tapered along a curved surface and terminating in an edge extending transverse to the tube axis, said edges of said jaws serving to establish a transversely extending crease line in the tube, each of said jaws being constituted by two half jaws meeting at said edge, and said jaw halves being movable pivotally from said crease line in opposite directions such that said curvilinear tapered end faces enlarge said crease line into a sealing zone and which includes said crease line located within the same, successive crease lines and sealing zones enlarged therefrom being perpendicular to each other.

11. Apparatus as defined in claim 10 and which includes knife blades located respectively between the jaw halves of each jaw, said knife blades being movable towards and slidable over each other to sever adjacent packages at said sealing zone therebetween subsequent to said pivotal movement of said jaw halves.

References Cited in the file of this patent

UNITED STATES PATENTS

| | | |
|---|---|---|
| 2,576,471 | Messmer et al. | Nov. 27, 1951 |
| 2,738,631 | Jarund | Mar. 20, 1956 |
| 2,741,079 | Rausing | Apr. 10, 1956 |
| 2,828,591 | Vanden Bosshe | Apr. 1, 1958 |
| 2,916,864 | Meissner | Dec. 15, 1959 |
| 2,928,219 | Gubler | Mar. 15, 1960 |

FOREIGN PATENTS

| | | |
|---|---|---|
| 149,954 | Australia | Feb. 10, 1953 |
| 716,783 | Great Britain | Oct. 13, 1954 |
| 1,156,566 | France | Dec. 16, 1957 |